US011312881B2

(12) United States Patent
Ekin et al.

(10) Patent No.: US 11,312,881 B2
(45) Date of Patent: Apr. 26, 2022

(54) ONE COMPONENT POLYURETHANE/ALLOPHANATE FORMULATIONS WITH REACTIVE REDUCER

(71) Applicant: Covestro LLC, Pittsburgh, PA (US)

(72) Inventors: Alan Ekin, Coraopolis, PA (US); Joseph Pierce, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 44 days.

(21) Appl. No.: 15/933,495

(22) Filed: Mar. 23, 2018

(65) Prior Publication Data
US 2019/0292400 A1    Sep. 26, 2019

(51) Int. Cl.
| | | |
|---|---|---|
| *C09D 175/02* | (2006.01) | |
| *C08G 18/02* | (2006.01) | |
| *C08K 5/29* | (2006.01) | |
| *C09D 7/63* | (2018.01) | |
| *C08G 18/78* | (2006.01) | |
| *C09D 175/04* | (2006.01) | |
| *C08G 18/20* | (2006.01) | |
| *C09D 175/06* | (2006.01) | |
| *C08G 18/18* | (2006.01) | |
| *C08G 18/42* | (2006.01) | |
| *C08G 18/62* | (2006.01) | |
| *C08G 18/79* | (2006.01) | |
| *C08G 18/48* | (2006.01) | |
| *C08G 18/44* | (2006.01) | |

(52) U.S. Cl.
CPC ......... *C09D 175/02* (2013.01); *C08G 18/027* (2013.01); *C08G 18/1858* (2013.01); *C08G 18/2027* (2013.01); *C08G 18/2036* (2013.01); *C08G 18/2063* (2013.01); *C08G 18/42* (2013.01); *C08G 18/4236* (2013.01); *C08G 18/4277* (2013.01); *C08G 18/44* (2013.01); *C08G 18/48* (2013.01); *C08G 18/6229* (2013.01); *C08G 18/7837* (2013.01); *C08G 18/797* (2013.01); *C08G 18/798* (2013.01); *C08K 5/29* (2013.01); *C09D 7/63* (2018.01); *C09D 175/04* (2013.01); *C09D 175/06* (2013.01); *C08G 2190/00* (2013.01)

(58) Field of Classification Search
CPC ...... C09D 175/02; C09D 7/63; C09D 175/04; C09D 175/06; C08K 5/29; C08G 18/48; C08G 18/027; C08G 18/1858; C08G 18/2036; C08G 18/2027; C08G 18/2063; C08G 18/6229; C08G 18/44; C08G 18/4277; C08G 18/4236; C08G 18/7837; C08G 18/797; C08G 18/798; C08G 2190/00; C08G 18/42

See application file for complete search history.

(56) References Cited

U.S. PATENT DOCUMENTS

| | | | |
|---|---|---|---|
| 3,169,949 A | | 2/1965 | Büning |
| 5,580,610 A | * | 12/1996 | Moy ........................ B05D 1/36 427/333 |
| 5,814,689 A | | 9/1998 | Goldstein et al. |
| 5,861,193 A | | 1/1999 | Goldstein et al. |
| 5,916,629 A | | 6/1999 | Wenning et al. |
| 8,791,223 B2 | | 7/2014 | Zalich et al. |
| 9,080,074 B2 | | 7/2015 | Shaffer et al. |
| 9,102,785 B2 | | 8/2015 | Martz et al. |
| 10,696,775 B2 | * | 6/2020 | Ekin ........................ C09D 7/63 |
| 10,731,051 B2 | * | 8/2020 | Ekin .................. C08G 18/6229 |
| 2006/0052527 A1 | | 3/2006 | Weikard et al. |
| 2006/0247341 A1 | | 11/2006 | Hsieh et al. |
| 2008/0194787 A1 | * | 8/2008 | Weiss .................. C08G 18/0895 528/67 |
| 2009/0264587 A1 | | 10/2009 | Blum et al. |
| 2012/0225982 A1 | * | 9/2012 | Ravichandran ...... C08K 5/0091 524/196 |
| 2014/0275345 A1 | * | 9/2014 | Williams .................. C09D 4/00 523/445 |
| 2015/0232609 A1 | | 8/2015 | Spryou et al. |
| 2016/0017179 A1 | | 1/2016 | Spyrou et al. |

FOREIGN PATENT DOCUMENTS

DE    102008040967 A1    2/2010

* cited by examiner

*Primary Examiner* — Rabon A Sergent
(74) *Attorney, Agent, or Firm* — John E. Mrozinski, Jr.

(57) ABSTRACT

The present invention provides an allophanate polymer system made by a method comprising combining a neutralized polyol with a polyuretdione resin in the presence of a reactive reducer comprising a reducing agent and a tertiary amine catalyst to produce a clear-coat, and contacting the clear-coat with a basecoat comprising a tertiary amine catalyst. The reaction between the polyol and the polyuretdione will proceed after the reactive reducer reduces the viscosity of the one component clear-coat formulation to appropriate levels. The inventive allophanate polymer system is particularly applicable in providing coatings, adhesives, castings, composites, and sealants with good performance.

8 Claims, No Drawings

ONE COMPONENT POLYURETHANE/ALLOPHANATE FORMULATIONS WITH REACTIVE REDUCER

FIELD OF THE INVENTION

The present invention relates, in general to polymers, and more specifically, to one component, polyurethane/allophanate clear-coat compositions used in conjunction with a basecoat and a reactive reducer. The reactive reducer contains a tertiary amine catalyst for a possible dual role of catalyzing the clear-coat and neutralizing the basecoat, if necessary.

BACKGROUND OF THE INVENTION

Polyurethane-forming compositions are widely used in a variety of commercial, industrial and household applications, such as in automotive clear-coat and seat cushion applications. Polyurethane systems that employ isocyanates which are pre-reacted with monofunctional reagents to form relatively thermally labile compounds are called blocked isocyanates. Uretdiones are a type of blocked isocyanate. Uretdiones are typically prepared by dimerizing isocyanate to form uretdione(s) with unreacted isocyanate end-groups which can then be extended with a polyol to form a polymeric material containing two or more uretdione groups in the polymer chain. In some literature, uretdiones are referred to as "1,3-diaza-2,4-cyclobutanones", "1,3-diazatidin-2,4-diones", "2,4-dioxo-1,3-diazetidines", "urethdiones" or "uretidiones". Typically, the polymer has few, if any, free isocyanate groups, which is achieved by controlling the stoichiometry of the polyisocyanate, polyol and by the use of a blocking agent.

Polyuretdiones may react with polyols in the presence of tertiary amine catalysts and thus do not form stable systems in terms of shelf-life. Therefore, polyuretdiones and polyols cannot form stable one component systems in the presence of suitable tertiary amine catalysts. In addition, when a clear-coat is applied over a basecoat, the tertiary amine catalyst is attracted to the acidic basecoat due to acidity differences between the clear-coat and the basecoat. If an excess amount of catalyst is added to the clear-coat to both catalyze the clear-coat and to neutralize the basecoat; then very short pot-life is provided for the clear-coat. To the best of the present inventors' knowledge, no one has developed a cross-linking approach using a one component clear-coat composition in conjunction with an optional basecoat using a reactive reducer.

SUMMARY OF THE INVENTION

Accordingly, the present invention attempts to alleviate problems inherent in the art by providing an alternative cross-linking approach to obtain compositions having physical properties similar to those of polyurethane compositions. Various embodiments of the inventive approach involve crosslinking polyuretdione resins with neutralized polyols in the presence of a reactive reducer containing a reducing agent and a tertiary amine catalyst. The reaction between the polyol and the polyuretdione will proceed once the reactive reducer has reduced the viscosity of the formulation to appropriate levels. In addition, clear-coat curing is improved as the reactive reducer reduces the viscosity of the basecoat and at the same time neutralizes the basecoat, if necessary. In case the basecoat does not require a neutralizer, the presence of tertiary amine in the basecoat can help with clear-coat curing by migrating to the clear-coat.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is used in certain instances. Thus, the articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although compositions and methods are described in terms of "comprising" various components or steps, the compositions and methods can also "consist essentially of" or "consist of" the various components or steps.

In various embodiments, the present invention provides a clear-coat composition comprising a neutralized polyol; a polyuretdione resin; and a reactive reducer comprising a tertiary amine catalyst and a reducing agent. In certain embodiments, the present invention provides a method of making a clear-coat comprising combining a polyuretdione resin and a neutralized polyol in the presence of a reactive reducer comprising a tertiary amine catalyst and a reducing agent. In some embodiments, the present invention also provides a one component composition comprising: a neutralized polyol; a polyuretdione resin; and a reducing agent, wherein the composition has a storage stability of at least 14 months, as measured by viscosity increase. In certain embodiments, the present invention provides an allophanate polymer system made by a method comprising combining a neutralized polyol with a polyuretdione resin in the presence of a reactive reducer comprising a tertiary amine catalyst and a reducing agent to produce a clear-coat, and contacting the clear-coat with a basecoat comprising a tertiary amine catalyst. The same or a different, reactive reducer may be used to reduce the viscosity of the basecoat and comprises a tertiary amine catalyst that acts as a neutralizer for acidic groups within the basecoat, if necessary. The polyuretdione and polyol of the formulations can be supplied together which makes them one component. The reaction between polyol and polyuretdione will proceed after the reactive reducer has reduced the viscosity of the formulation to an appropriate level. The reactive reducer contains a reducing agent (solvent) and a catalyst. Thus, the present invention provides a method for producing an allophanate polymer by the following route:

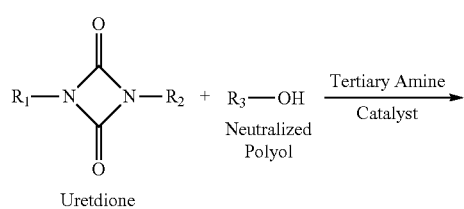

Uretdione

Neutralized Polyol

Tertiary Amine Catalyst

-continued

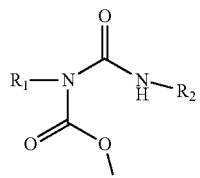

Allophanate

The inventive allophanate polymer system is particularly applicable in producing coatings, adhesives, castings, composites, and sealants.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "polyol" refers to compounds comprising at least two free hydroxy groups. Polyols include polymers comprising pendant and terminal hydroxy groups.

As used herein, the term "coating composition" refers to a mixture of chemical components that will cure and form a coating when applied to a substrate.

The terms "adhesive" or "adhesive compound", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant composition" refers to a composition which may be applied to one or more surfaces to form a protective barrier, for example to prevent ingress or egress of solid, liquid or gaseous material or alternatively to allow selective permeability through the barrier to gas and liquid. In particular, it may provide a seal between surfaces.

A "casting composition" refers to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

"Cured," "cured composition" or "cured compound" refers to components and mixtures obtained from reactive curable original compound(s) or mixture(s) thereof which have undergone a chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is (are) not cured.

The term "basecoat" means the first (undermost) layer applied to the surface of a substrate prior to application of a subsequent or finishing coat. The term encompasses basecoats, undercoats, and tiecoats.

The components useful in the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, aromatic polyisocyanates, cycloaliphatic polyisocyanates and aralkyl polyisocyanates.

Particularly preferred in the present invention are those blocked isocyanates known as uretdiones. The uretdiones useful in the invention may be obtained by catalytic dimerization of polyisocyanates by methods which are known to those skilled in the art. Examples of dimerization catalysts include, but are not limited to, trialkylphosphines, aminophosphines and aminopyradines such as dimethylaminopyridines, and tris(dimethylamino)phosphine, as well as any other dimerization catalyst. The result of the dimerization reaction depends, in a manner known to the skilled person, on the catalyst used, on the process conditions and on the polyisocyanates employed. In particular, it is possible for products to be formed which contain on average more than one uretdione group per molecule, the number of uretdione groups being subject to a distribution. The (poly) uretdiones may optionally contain isocyanurate, biuret, allophanate, and iminooxadiazine dione groups in addition to the uretdione groups.

The uretdiones are NCO-functional compounds and may be subjected to a further reaction, for example, blocking of the free NCO groups or further reaction of NCO groups with NCO-reactive compounds having a functionality of two or more to extend the uretdiones to form polyuretdione prepolymers. This gives compounds containing uretdione groups and of higher molecular weight, which, depending on the chosen proportions, may also contain NCO groups, be free of NCO groups or may contain isocyanate groups that are blocked.

Suitable blocking agents include, but are not limited to, alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, caprolactam, N-tert-butylbenzylamine and cyclopentanone including mixtures of these blocking agents.

Examples of NCO-reactive compounds with a functionality of two or more include polyols. In some embodiments, the NCO-reactive compounds are used in amounts sufficient to react with all free NCO groups in the uretdione. By "free NCO groups" it is meant all NCO groups not present as part of the uretdione, isocyanurate, biuret, allophanate and iminooxadiazine dione groups.

The resulting polyuretdione contains at least 2, such as from 2 to 10 uretdione groups. More preferably, the polyuretdione contains from 5% to 45% uretdione, 10% to 55% urethane, and less than 2% isocyanate groups. The percentages are by weight based on total weight of resin containing uretdione, urethane, and isocyanate.

Suitable polyisocyanates for producing the uretdiones useful in embodiments of the invention include, organic diisocyanates represented by the formula

wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms.

Examples of the organic diisocyanates which are particularly suitable for the present invention include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanatomethyl cyclohexane, and 2,4- and 2,6-hexahydrotoluene diisocyanate, toluene diisocyanate (TDI), diphenylmethane diisocyanate (MDI), pentane diisocyanate (PDI)—biobased, and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyuretdione polyurethane oligomers.

In some embodiments, the uretdiones may comprise from 35% to 85% resin solids in the composition of present invention, excluding solvents, additives or pigments. In other embodiments, from 50% to 85% and in still other embodiments, 60% to 85%. The uretdiones may comprise any resin solids amount ranging between any combinations of these values, inclusive of the recited values.

The polyols useful in the present invention may be either low molecular weight (65-399 Da, as determined by gel permeation chromatography) or high molecular weight (400 to 10,000 Da, as determined by gel permeation chromatography) materials and in various embodiments will have average hydroxyl values as determined by ASTM E222-10, Method B, of between 1000 and 10, and preferably between 500 and 50.

The polyol of the present invention includes low molecular weight diols, triols and higher alcohols and polymeric polyols such as polyester polyols, polyether polyols, polycarbonate polyols, polyurethane polyols and hydroxy-containing (meth)acrylic polymers.

The low molecular weight diols, triols and higher alcohols useful in the instant invention are known to those skilled in the art. In many embodiments, they are monomeric and have hydroxy values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as cyclohexane dimethanol. Examples of triols and higher alcohols include trimethylol propane and pentaerythritol. Also useful are polyols containing ether linkages such as diethylene glycol and triethylene glycol.

In various embodiments, the suitable polyols are polymeric polyols having hydroxyl values less than 200, such as 10 to 180. Examples of polymeric polyols include polyalkylene ether polyols, polyester polyols including hydroxyl-containing polycaprolactones, hydroxy-containing (meth)acrylic polymers, polycarbonate polyols and polyurethane polymers.

Examples of polyether polyols include poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is by reacting a polyol with an alkylene oxide, for example, ethylene oxide in the presence of an acidic or basic catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (propane-1,2,3-tricarboxylic acid). Where acids are referred to above, it is understood that the anhydrides of those acids which form anhydrides can be used in place of the acid. Also, lower alkyl esters of acids such as dimethyl glutamate can be used.

Besides polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,949.

In addition to the polyether and polyester polyols, hydroxy-containing (meth)acrylic polymers or (meth) acrylic polyols can be used as the polyol component.

Among the (meth)acrylic polymers are polymers of 2 to 20 percent by weight primary hydroxy-containing vinyl monomers such as hydroxyalkyl acrylate and methacrylate having 2 to 6 carbon atoms in the alkyl group and 80 to 98 percent by weight of other ethylenically unsaturated copolymerizable materials such as alkyl(meth)acrylates; the percentages by weight being based on the total weight of the monomeric charge.

Examples of suitable hydroxy alkyl(meth)acrylates are hydroxy ethyl and hydroxy butyl(meth)acrylate. Examples of suitable alkyl acrylates and (meth)acrylates are lauryl methacrylate, 2-ethylhexyl methacrylate and n-butyl acrylate.

In addition to the acrylates and methacrylates, other copolymerizable monomers which can be copolymerized with the hydroxyalkyl (meth)acrylates include ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, α-methyl styrene, α-methyl chlorostyrene, vinyl butyrate, vinyl acetate, alkyl chloride, divinyl benzene, diallyl itaconate, triallyl cyanurate and mixtures thereof. Preferably, these other ethylenically unsaturated materials are used in admixture with the above-mentioned acrylates and methacrylates.

In certain embodiments of the invention, the polyol may be a polyurethane polyol. These polyols can be prepared by reacting any of the above-mentioned polyols with a minor amount of polyisocyanate (OH/NCO equivalent ratio greater than 1:1) so that free primary hydroxyl groups are present in the product. In addition to the high molecular weight polyols mentioned above, mixtures of both high molecular weight and low molecular weight polyols such as those mentioned above may be used.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

In various embodiments of the invention, the polyol is neutralized, for example by the addition of an acid scavenger. Acid scavengers should be covalently bonded to the acidic groups within the polyol. Acid scavengers may be selected from carbodiimides, anhydrides, epoxies, trialkylorthoformates, amine compounds, or oxazolines. The present inventors believe, without wishing to be bound to any specific theory, that these acid scavengers covalently bind to carboxylic and acrylic acid groups within the polyols. Such compounds are commercially available from a variety of suppliers, such as for example, the monomeric carbodiimides sold under the STABAXOL trade name from Rhein Chemie, and bis(2,6-diisopropylphenyl) carbodiimide sold as EUSTAB HS-700 by Eutec Chemical Co., Ltd.

Urethane reducing agents come in slow, medium and fast formulations, and may improve atomization, flow and leveling, which helps to provide a smooth finish with less "orange peel" effect. Depending on the "speed" of the reducer, the reducing agent of the present invention may contain various combinations of compounds including, but not limited to, n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, Varnish Makers and Painter (VM&P) naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate.

Examples of suitable solvents include, but are not limited to aliphatic and aromatic hydrocarbons such as toluene, xylene, isooctane, acetone, butanone, methyl ethyl ketone, methyl amyl ketone, methyl isobutyl ketone, ethyl acetate, butyl acetate, pentyl acetate, tetrahydrofuran, ethyl ethoxypropionate, N-methyl-pyrrolidone, dimethylacetamide and dimethylformamide solvent naphtha, SOLVESSO 100 or HYDROSOL (ARAL), ethers, or mixtures thereof.

The clear-coat composition of the invention may be contacted with the basecoat by any methods known to those skilled in the art, including but not limited to, spraying, dipping, flow coating, rolling, brushing, pouring, and the like. The clear-coat compositions may be applied in the form of paints or lacquers onto any compatible substrate, such as, for example, metals, plastics, ceramics, glass, and natural materials. In certain preferred embodiments, the clear-coat composition is applied as a single layer. In other embodiments, it may be applied as multiple layers as needed. The reaction between the polyol and the polyuretdione will proceed once the reactive reducer has reduced the viscosity of the formulation to appropriate levels. In addition, clear-coat curing is improved as the reactive reducer reduces the viscosity of the basecoat and at the same time neutralizes the basecoat, if necessary. In case the basecoat does not require a neutralizer, the presence of tertiary amine in the basecoat can help with clear-coat curing by migrating to the clear-coat.

Although described in this disclosure in the context of a clear-coating composition, those skilled in the art will appreciate that the present invention would perform equally as well with pigments, dyes or other colorants included in the composition and the present invention encompasses all such embodiments.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. Although the present invention is described in the instant Examples in the context of a coating, those skilled in the art will appreciate it can also be equally applicable to adhesives, castings, composites, and sealants.

Further, although the embodiments of the present invention described herein contain the same reactive reducer in the clear-coat composition and the basecoat, the present invention is not to be so limited. In some embodiments, the clear-coat composition and the basecoat may contain the same reactive reducer and in other embodiments they may contain different reactive reducers.

The following materials were used in preparing the compositions of the EXAMPLES:

| | |
|---|---|
| POLYOL A | an aromatic free, branched hydroxyl-bearing polyester polyol, commercially available from Covestro as DESMOPHEN 775 XP; |
| ADDITIVE A | an active anti-hydrolysis agent for polyester polyurethanes, being used as an acid scavenger for acidic groups within the polyols, commercially available from Rhein Chemie as STABAXOL I; |
| ADDITIVE B | a surface additive on polyacrylate-basis for solvent-borne coating systems and printing inks, commercially available from BYK Chemie as BYK 358N; |
| CATALYST A | 1,8-diazabicyclo[5.4.0]undec-7-ene (DBU), tertiary amine catalyst, commercially available from Air Products as POLYCAT DBU; |
| URETDIONE A | a 1-isocyanato-3-isocyanatomethyl-3,5,5-trimethyl cyclohexane (isophorone diisocyanate or IPDI)-based uretdione, commercially available from Covestro as CRELAN EF 403; |
| REDUCER A | a universal medium reducer, commercially available from BASF as RM UR 50, recommended for use in temperatures between approximately 70° F.-85° F. (21.1° C.-29.4° C.); |
| REACTIVE REDUCER B | 150 parts REDUCER A and the listed amount of CATALYST A mixed with a FLACKTEK speed mixer; |
| BASECOAT A | a black polyester refinish basecoat, commercially available from BASF as DIAMONT RM D403; |
| BASECOAT B | 100 parts BASECOAT A and 50 parts REACTIVE REDUCER B mixed with a FLACKTEK speed mixer; |
| PRIMER A | a urethane based two component refinish primer, commercially available from BASF as DIAMONT DP 25 |

REACTIVE REDUCER B was added to both BASECOAT B and CLEAR-COAT A just before spray application.

BASECOAT B was spray applied with a conventional high-volume, low-pressure (HVLP) sprayer over PRIMER A.

CLEAR-COAT FORMULATION A was prepared as follows. POLYOL A was reacted with ADDITIVE A prior to formulation. In a 500 mL plastic container 14.17 parts of POLYOL A and ADDITIVE A mixture, 0.57 parts ADDITIVE B, 7.90 parts n-butyl acetate ("n-BA"), 96.61 parts URETDIONE A were added. The resulting mixture was mixed using a FLACKTEK speed mixer for one minute. Just prior to spraying, 100 parts REACTIVE REDUCER B was added to CLEAR-COAT A and mixed with a FLACKTEK speed mixer for one minute. This mixture was spray applied using a conventional HVLP sprayer.

Iron phosphate-treated ACT B1000 4"×12" (10.2 cm×30.5 cm) test panels were sprayed with PRIMER A (polyurethane automotive primer) before receiving BASECOAT followed by CLEAR-COAT A. The thickness of the black polyester BASECOAT A was 2 mils (50 µm) wet and the thickness of CLEAR-COAT A was 5 mils (125 µm) wet (2 mils (50 µm) dry). The resulting panels were tested for microhardness and MEK double rubs and the results are summarized in Table I.

Films were cured at room temperature (21° C.-24° C.) for one day, three days, one week, three weeks, and five weeks before testing.

Microhardness (Marten's hardness) measurements were done using FISCHERSCOPE H100C instrument with the method described in DIN EN ISO 14577. Microhardness readings were taken under a 20 mN test load run to a maximum of 5 µm indentation depths over a 20-second application time. Results reported are an average of three readings for each formulation.

MEK double rubs were measured according to ASTM D4752-10(2015). Results reported are an average of three readings for each formulation.

Table II summarizes the viscosities of the Formulation A (clear-coat only) from Table I. Viscosities were measured according to ASTM D7395-07 (2012) using a BROOK- FIELD RST Rheometer at 25° C., 100 s-1 shear rate for two minutes with a RST-50-1 spindle. "Initial viscosity" refers to the viscosity of the composition at the time it was made and "14 month viscosity" refers to the viscosity of the composition after 14 months of being stored at room temperature.

TABLE I

|  | A | B | C | D |
|---|---|---|---|---|
| REACTIVE REDUCER B | | | | |
| REDUCER A (mL) | 150 | 150 | 150 | 150 |
| CATALYST A | 0.0 | 0.44 | 0.88 | 1.47 |
| BASECOAT B | | | | |
| BASECOAT A (mL) | 100 | 100 | 100 | 100 |
| REACTIVE REDUCER B (mL) | 50 | 50 | 50 | 50 |
| CLEAR-COAT A | | | | |
| POLYOL A | 14.03 | 14.03 | 14.03 | 14.03 |
| ADDITIVE A | 0.14 | 0.14 | 0.14 | 0.14 |
| ADDITIVE B | 0.57 | 0.57 | 0.57 | 0.57 |
| n-BA | 7.90 | 7.90 | 7.90 | 7.90 |
| URETDIONE A (50% in n-BA) | 96.61 | 96.61 | 96.61 | 96.61 |
| REACTIVE REDUCER B (mL) | 100 | 100 | 100 | 100 |
| Microhardness (N/mm$^2$) | | | | |
| 1 Day | 0.4 | 0.3 | 1.4 | 14.2 |
| 3 Days | 0.9 | 1.2 | 3.9 | 44.0 |
| 1 Week | 1.3 | 1.3 | 4.7 | 50.9 |
| 3 Weeks | 2.5 | 4.4 | 9.4 | 84.8 |
| 5 Weeks | 6.0 | 9.3 | 38.1 | 102.8 |
| MEK Double Rubs | | | | |
| 1 Day | 3 | 3 | 5 | 25 |
| 3 Days | 3 | 4 | 5 | 85 |
| 1 Week | 3 | 4 | 10 | 115 |
| 3 Weeks | 3 | 4 | 10 | >200 |
| 5 Weeks | 3 | 4 | 25 | >200 |

As can be appreciated by reference to Table I, REACTIVE REDUCER B was prepared using REDUCER A and catalyst. Formulation A did not contain any catalyst; therefore, it was a control formulation for both basecoat and clear-coat. Formulations B, C, and D contained increasing levels of catalyst. Formulation A had very poor performance in terms of microhardness and MEK double rubs. The performance of coating increased as the amount of catalyst in REACTIVE REDUCER B was increased (Formulations B through D). Formulations B and C had enough levels of catalyst for clear-coat; however, not enough catalyst to act as a neutralizer for basecoat. Formulation D had enough amount of catalyst to catalyze clear-coat and to neutralize basecoat. Thus, the present inventors postulate that the catalyst may play a dual role; a) to catalyze clear-coat and b) to neutralize the acidic basecoat.

TABLE II

| Viscosity (cPs) | |
|---|---|
| Initial | 57 |
| 14 months | 65 |

Table II summarizes the viscosities of Formulation A (clear-coat only) and establishes its storage stability. The one component clear-coat had all the components mixed except the catalyst. To show that the inventive formulation can be supplied as one component, it was stored at room temperature for 14 months. It is apparent to those skilled in the art that the viscosity of the formulation showed no signs of viscosity increase over that time, thus demonstrating that the inventive coating can be stored as one component for an extended time.

The one component allophanate polymers produced by the present invention are believed to be particularly applicable for coatings, adhesives, castings, composites, and sealants.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A clear-coat composition comprising: a neutralized polyol; a polyuretdione resin; and a reactive reducer comprising a reducing agent and a tertiary amine catalyst.

2. The clear-coat composition according to clause 1, wherein the neutralized polyol comprises the reaction product of a polyol and an acid scavenger.

3. The clear-coat composition according to clause 2, wherein the polyol is selected from the group consisting of polyalkylene ether polyol, polyester polyol including hydroxyl containing polycaprolactones, hydroxyl-containing (meth)acrylic polymers, polycarbonate polyol, and polyurethane polyol and combinations thereof.

4. The clear-coat composition according to one of clauses 1 to 3, wherein the reducing agent is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4-(triflouromethyl) benzene, propylene glycol methyl ether, and ethyl-3-ethoxy propionate and combinations thereof.

5. The clear-coat composition according to one of clauses 1 to 4, wherein the composition further includes an additive package selected from the group consisting of flow control additives, wetting agents, and a solvent.

6. The clear-coat composition according to one of clauses 1 to 5, wherein the polyuretdione resin comprises the reaction product of catalytic dimerization of an isocyanate.

7. The clear-coat composition according to clause 5, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanatomethyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methylcyclohexyl)-methane, α,α,α',α'-tetramethyl-1,3- and 1,4- xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

8. The clear-coat composition according to clause 2, wherein the acid scavenger is covalently bonded to acidic groups within the polyol and is selected from the group consisting of carbodiimides, anhydrides, epoxies, trialkylorthoformates, amine compounds, oxazolines, and combinations thereof.

9. The clear-coat composition according to one of clauses 1 to 8, wherein the reactive reducer contains an amidine.

10. The clear-coat composition according to one of clauses 1 to 9, wherein the reactive reducer contains one selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethyl-guanidine, and combinations thereof.

11. A method of applying the clear-coat composition made according to one of clauses 1 to 10 to a substrate, wherein the method comprises at least one of spraying, dipping, flow coating, rolling, brushing, and pouring.

12. A one component composition comprising: a neutralized polyol; a polyuretdione resin; and a reducing agent, wherein the composition has a storage stability of at least 14 months, as measured by viscosity increase.

13. A method of making a clear-coat composition comprising: combining a polyuretdione resin and a neutralized polyol in the presence of a reactive reducer comprising a reducing agent and a tertiary amine catalyst.

14. The method according to clause 13 further including adding an additive package selected from the group consisting of flow control additives, and wetting agents, and a solvent.

15. The method according to one of clauses 13 and 14, wherein the neutralized polyol comprises the reaction product of a polyol and an acid scavenger.

16. The method according to clause 15, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols, and combinations thereof.

17. The method according to one of clauses 13 to 16, wherein the polyuretdione resin comprises the reaction product of catalytic dimerization of an isocyanate.

18. The method according to clause 17, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

19. The method according to one of clauses 13 to 18, wherein the reducing agent is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

20. The method according to clause 15, wherein the acid scavenger is covalently bonded to acidic groups within the polyol and is selected from the group consisting of carbodiimides, anhydrides, epoxies, trialkylorthoformates, amine compounds, oxazolines, and combinations thereof.

21. The method according to clauses 13 to 20, wherein the reactive reducer contains an amidine.

22. The method according to clauses 13 to 21, wherein the reactive reducer contains one selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

23. A method of applying the clear-coat composition made according to one of clauses 13 to 22 to a substrate, wherein the method comprises at least one of spraying, dipping, flow coating, rolling, brushing, and pouring.

24. An allophanate polymer system made by a method comprising: combining a neutralized polyol with a polyuretdione resin in the presence of a reactive reducer comprising a reducing agent and a tertiary amine catalyst to produce a clear-coat, and contacting the clear-coat with a basecoat comprising a reactive reducer which is the same as or different from the reactive reducer in the clear-coat.

25. The allophanate polymer system according to clause 24, wherein the polyol is selected from the group consisting of polyalkylene ether polyols, polyester polyols, hydroxyl containing polycaprolactones, hydroxyl-containing (meth)acrylic polymers, polycarbonate polyols, polyurethane polyols, and combinations thereof.

26. The allophanate polymer system according to one of clauses 24 and 25 further including an additive package selected from the group consisting of flow control additives, wetting agents, and a solvent.

27. The allophanate polymer system according to one of clauses 24 to 26, wherein the polyuretdione resin comprises the reaction product of catalytic dimerization of an isocyanate.

28. The allophanate polymer system according to clause 27, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

29. The allophanate polymer system according to one of clauses 24 to 28, wherein the reducing agent is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

30. The allophanate polymer system according to one of clauses 24 to 29, wherein the neutralized polyol comprises the reaction product of a polyol and an acid scavenger.

31. The allophanate polymer system according to clause 30, wherein the acid scavenger is covalently bonded to acidic groups within the polyol and is selected from the group consisting of carbodiimides, anhydrides, epoxies, trialkylorthoformates, amine compounds, oxazolines, and combinations thereof.

32. The allophanate polymer according to clauses 24 to 31, wherein the reactive reducer contains an amidine.

33. The allophanate polymer according to clauses 24 to 32, wherein the reactive reducer contains one selected from the group consisting of 1,8-diazabicyclo[5.4.0]undec-7-ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

34. The allophanate polymer system according to one of clauses 24 to 33, wherein the contacting comprises at least one of spraying, dipping, flow coating, rolling, brushing, and pouring.

35. One of a coating, an adhesive, a casting, a composite, and a sealant comprising the allophanate polymer system according to one of clauses 24 to 34.

What is claimed is:

1. An allophanate polymer system made by a method comprising:
   combining a neutralized polyester polyol with a polyuretdione resin in the presence of a reactive reducer comprising a reducing agent and a tertiary amine catalyst to produce a one component clear-coat, and
   contacting the clear-coat with an acidic basecoat comprising a reactive reducer which is the same as or different from the reactive reducer in the one component clear-coat,
   wherein the polyuretdione resin forms an allophanate polymer system, wherein the tertiary amine catalyst of the reactive reducer catalyzes the clear-coat and neutralizes the acidic basecoat, and wherein the tertiary amine catalyst is 1,8-diazabicyclo[5.4.0]undec-7-ene.

2. The allophanate polymer system according to claim 1, wherein the neutralized polyol comprises the reaction product of a polyester polyol and an acid scavenger.

3. The allophanate polymer system according to claim 2, wherein the acid scavenger is covalently bonded to acidic groups within the polyester polyol and is selected from the group consisting of carbodiimides, anhydrides, epoxies, trialkylorthoformates, amine compounds, oxazolines, and combinations thereof.

4. The allophanate polymer system according to claim 1, wherein the polyuretdione resin comprises the reaction product of catalytic dimerization of an isocyanate.

5. The allophanate polymer system according to claim 4, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanatomethyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methylcyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

6. The allophanate polymer system according to claim 1, wherein the reducing agent is selected from the group consisting of n-butyl acetate, ethyl acetate, 2-methoxy-1-methylethyl acetate, 1-methoxy-2-propyl acetate, 2-methoxy-1-propyl acetate, 2-ethoxyethyl acetate, n-heptane, methylcyclohexane, toluene, acetone, VM&P naphtha, naphtha, light aliphatic solvent naphtha, acetate, isobutyl acetate, mixed xylenes, ethylbenzene, methyl ethyl ketone, dimethyl ketone, methyl n-amyl ketone, methyl isobutyl ketone, 1,2,4 trimethyl benzene, isopropylbenzene, ethyl benzene, 1-chloro-4 (triflouromethyl) benzene, propylene glycol methyl ether, and ethyl-3-ethoxy propionate and combinations thereof.

7. One of a coating, an adhesive, a casting, a composite, and a sealant comprising the allophanate polymer system according to claim 1.

8. The allophanate polymer system according to claim 1, wherein the contacting comprises at least one selected from the group consisting of spraying, dipping, flow coating, rolling, brushing, and pouring.

\* \* \* \* \*